US006545080B2

(12) United States Patent
Adedeji et al.

(10) Patent No.: US 6,545,080 B2
(45) Date of Patent: Apr. 8, 2003

(54) GLASS-FILLED POLY(ARYLENE ETHER)-POLYOLEFIN COMPOSITION AND ARTICLES DERIVED THEREFROM

(75) Inventors: Adeyinka Adedeji, Albany, NY (US); Thomas J. Hartle, Delmar, NY (US); John C. Haylock, Schenectady, NY (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/682,928

(22) Filed: Nov. 1, 2001

(65) Prior Publication Data

US 2002/0128368 A1 Sep. 12, 2002

Related U.S. Application Data

(60) Provisional application No. 60/258,896, filed on Dec. 28, 2000.

(51) Int. Cl.$^7$ .............................. C08J 5/10; C08K 3/40; C08L 71/12
(52) U.S. Cl. ........................ 524/494; 524/492; 524/493
(58) Field of Search ................................ 524/494, 493, 524/492

(56) References Cited

U.S. PATENT DOCUMENTS

| | | |
|---|---|---|
| 4,239,673 A | 12/1980 | Lee, Jr. |
| 4,242,263 A | 12/1980 | Lee, Jr. |
| 4,299,757 A | 11/1981 | Kuribayashi et al. |
| 4,383,082 A | 5/1983 | Lee, Jr. |
| 4,460,743 A | 7/1984 | Abe et al. |
| 4,565,684 A | 1/1986 | Tibbetts et al. |
| 4,572,813 A | 2/1986 | Arakawa |
| 4,663,230 A | 5/1987 | Tennent |
| 4,713,416 A | 12/1987 | Del Giudice et al. |
| 4,764,559 A | 8/1988 | Yamauchi et al. |
| 4,772,657 A | 9/1988 | Akiyama et al. |
| 4,816,289 A | 3/1989 | Komatsu et al. |
| 4,863,997 A | 9/1989 | Shibuya et al. |
| 4,876,078 A | 10/1989 | Arakawa et al. |
| 4,892,904 A | 1/1990 | Ting |
| 4,962,148 A | 10/1990 | Orikasa et al. |
| 4,985,495 A | 1/1991 | Nishio et al. |
| 4,990,558 A | 2/1991 | DeNicola, Jr. et al. |
| 4,994,508 A | 2/1991 | Shiraki et al. |
| 5,024,818 A | 6/1991 | Tibbetts et al. |
| 5,061,753 A | 10/1991 | Maruyama et al. |
| 5,071,911 A | 12/1991 | Furuta et al. |
| 5,071,912 A | 12/1991 | Furuta et al. |
| 5,075,376 A | 12/1991 | Furuta et al. |
| 5,079,295 A | 1/1992 | Furuta et al. |
| 5,081,187 A | 1/1992 | Maruyama et al. |
| 5,086,112 A | 2/1992 | Togo et al. |
| 5,106,696 A | 4/1992 | Chundury et al. |
| 5,124,410 A | 6/1992 | Campbell |
| 5,132,363 A | 7/1992 | Furuta et al. |
| 5,149,740 A | 9/1992 | Maruyama et al. |

(List continued on next page.)

FOREIGN PATENT DOCUMENTS

| | | |
|---|---|---|
| EP | 0 326 895 A2 | 1/1989 |
| EP | 0 412 787 A3 | 2/1991 |
| EP | 1 029 876 | 9/1999 |
| GB | 1 559 262 | 12/1977 |
| JP | 58-93730 | * 6/1983 |
| JP | 63-113047 | 5/1988 |
| JP | 63-113049 | 5/1988 |
| JP | 63-113050 | 5/1988 |
| JP | 01-098647 | 4/1989 |
| JP | 03-259941 | 11/1991 |
| JP | 04-007357 | 1/1992 |
| JP | 04-028739 | 1/1992 |
| JP | 04-028740 | 1/1992 |
| JP | 04-279697 | 10/1992 |
| JP | 04-293942 | 10/1992 |
| JP | 05-070679 | 3/1993 |
| JP | 05-295184 | 11/1993 |
| JP | 06-009828 | 1/1994 |
| JP | 06-016924 | 1/1994 |
| JP | 06-057130 | 3/1994 |
| JP | 06-136202 | 5/1994 |
| JP | 07-003083 | 1/1995 |
| JP | 07-304908 | 11/1995 |

(List continued on next page.)

OTHER PUBLICATIONS

U.S. patent application Ser. No. 09/682,919, Adedeji et al., filed Nov. 1, 2001.

U.S. patent application Ser. No. 09/682,920, Adedeji et al., filed Nov. 1, 2001.

U.S. patent application Ser. No. 09/682,921, Adedeji et al., filed Nov. 1, 2001.

U.S. patent application Ser. No. 09/682,923, Adedeji et al., filed Nov. 1, 2001.

U.S. patent application Ser. No. 09/682,926, Adedeji et al., filed Nov. 1, 2001.

U.S. patent application Ser. No. 09/682,929, Adedeji et al., filed Nov. 1, 2001.

(List continued on next page.)

*Primary Examiner*—James J. Seidleck
*Assistant Examiner*—U. K. Rajguru

(57) ABSTRACT

A reinforced thermoplastic composition includes specific amounts of a poly(arylene ether), a homopolymer of an alkenyl aromatic monomer, a polyolefin, a hydrogenated block copolymer with a high styrene content, an unhydrogenated block copolymer, and glass fibers. The composition exhibits very high stiffness while maintaining high impact strength.

39 Claims, No Drawings

U.S. PATENT DOCUMENTS

| | | |
|---|---|---|
| 5,159,004 A | 10/1992 | Furuta et al. |
| 5,162,433 A | 11/1992 | Nishio et al. |
| 5,162,435 A | 11/1992 | Shibuya et al. |
| 5,162,440 A | 11/1992 | Akkapeddi et al. |
| 5,165,909 A | 11/1992 | Tennent et al. |
| 5,166,264 A | 11/1992 | Lee, Jr. et al. |
| 5,182,151 A | 1/1993 | Furuta et al. |
| 5,191,024 A | 3/1993 | Shibata et al. |
| 5,206,281 A | 4/1993 | Furuta et al. |
| 5,262,477 A | 11/1993 | Kasai et al. |
| 5,268,425 A | 12/1993 | Furuta et al. |
| 5,272,208 A | 12/1993 | Shiraki et al. |
| 5,272,209 A | 12/1993 | Shiraki et al. |
| 5,278,220 A | 1/1994 | Vermeire et al. |
| 5,286,791 A | 2/1994 | DeNicola, Jr. et al. |
| 5,290,856 A | 3/1994 | Okamoto et al. |
| 5,296,540 A | 3/1994 | Akiyama et al. |
| 5,304,593 A | 4/1994 | Nishio et al. |
| 5,321,081 A | 6/1994 | Chundury et al. |
| 5,369,173 A | 11/1994 | Furuta |
| 5,370,813 A | 12/1994 | DeNicola, Jr. et al. |
| 5,397,822 A * | 3/1995 | Lee, Jr. ................... 524/127 |
| 5,405,902 A | 4/1995 | Nishio et al. |
| 5,418,287 A | 5/1995 | Tanaka et al. |
| 5,424,360 A * | 6/1995 | Nagaoka et al. ............ 525/66 |
| 5,428,091 A | 6/1995 | Abe et al. |
| 5,461,111 A | 10/1995 | Modic et al. |
| 5,473,015 A | 12/1995 | DeNicola, Jr. et al. |
| 5,494,962 A | 2/1996 | Gauthy et al. |
| 5,589,152 A | 12/1996 | Tennent et al. |
| 5,591,382 A | 1/1997 | Nahass et al. |
| 5,648,424 A | 7/1997 | Miwa et al. |
| 5,686,528 A | 11/1997 | Wills et al. |
| 5,705,556 A | 1/1998 | Djiauw et al. |
| 5,777,028 A | 7/1998 | Okada et al. |
| 5,902,850 A | 5/1999 | Chino et al. |
| 5,998,029 A | 12/1999 | Adzima et al. |
| 6,005,050 A | 12/1999 | Okada et al. |
| 6,013,726 A | 1/2000 | Nakano et al. |
| 6,031,049 A | 2/2000 | Chino et al. |
| 6,045,883 A | 4/2000 | Akiyama et al. |
| 6,057,401 A | 5/2000 | Modic |
| 6,258,881 B1 * | 7/2001 | Moritomi ................... 524/267 |
| 6,300,417 B1 | 10/2001 | Sue et al. |
| 2002/0023845 A1 | 2/2002 | Ding et al. |

FOREIGN PATENT DOCUMENTS

| | | |
|---|---|---|
| JP | 09-316322 | 12/1997 |
| JP | 11-060836 | 3/1999 |
| JP | 2000-143891 | 5/2000 |
| WO | WO 90/05759 | 5/1990 |
| WO | WO 91/05016 | 4/1991 |

OTHER PUBLICATIONS

U.S. patent application Ser. No. 09/683,766, Adedeji et al., filed Feb. 12, 2002.

U.S. patent application Ser. No. 10/063,336, Adedeji et al., filed Apr. 12, 2002.

G.-X. Wei, H.-J. Sue, J. Chu, C. Huang, K. Gong, "Morphology and Mechanical Property of Poly(phenylene oxide) Modified Polypropylene Blends", ANTEC '99, vol. III, New York City, May 2nd–6th 1999, pp. 3443–3447.

Chemical Abstracts Record for JP 03181555.
Chemical Abstracts Record for JP 03185058.
Chemical Abstracts Record for JP 03231962.
Chemical Abstracts Record for JP 04183748.
Chemical Abstracts Record for JP 07165998.
Chemical Abstracts Record for JP 07166026.

* cited by examiner

GLASS-FILLED POLY(ARYLENE ETHER)-POLYOLEFIN COMPOSITION AND ARTICLES DERIVED THEREFROM

CROSS REFERENCE TO RELATED APPLICATIONS

This application claims the benefit of U.S. Provisional Application Ser. No. 60/258,896 filed Dec. 28, 2000.

BACKGROUND OF INVENTION

Compositions comprising poly(arylene ether)s and polyolefins are known in the art, and compositions further comprising a variety of impact modifiers and compatibilizing agents have been described.

U.S. Pat. No. 4,764,559 to Yamauchi et al. generally describes a composition comprising (a) a polyphenylene ether having a low degree of polymerization, with or without a styrene resin, (b) a polyolefin, and (c) a styrene compound/conjugated diene block copolymer or a hydrogenation product thereof. Use of inorganic fillers, such as glass fiber, potassium titanate whiskers, talc, and precipitated calcium carbonate, is described.

U.S. Pat. No. 4,863,997 to Shibuya et al. generally describes a composition comprising (a) a polyolefin resin, (b) a polyphenylene ether resin, and (c) a hydrogenated block copolymer of an alkenyl aromatic compound and a conjugated diene that contains 45–80 weight percent of a repeating unit derived from the alkenyl aromatic compound. Addition of fillers, such as glass fiber, wollastonite, potassium titanate whiskers, mica, talc, and calcium carbonate, is described.

U.S. Pat. No. 4,892,904 to Ting generally describes compositions comprising (a) a polyphenylene ether, (b) a poly(alkenyl aromatic) resin, (c) a polyolefin resin, (d) an alkenyl aromatic copolymer or terpolymer, and (e) a minor amount of fibrous glass.

U.S. Pat. No. 5,071,912 to Furuta et al. generally describes a composition comprising (a) a polyphenylene ether, (b) a styrene-modified propylene polymer or a composition containing a styrene-modified propylene polymer and polypropylene, and (c) at least two rubbery substances, one being compatible with (a) and the other incompatible with (a). Use of reinforcing agents and inorganic fillers is described.

U.S. Pat. No. 5,081,187 to Maruyama et al. generally describes a composition comprising specific amounts of (a) a polyolefin, (b) a polyphenylene ether, (c) a partially hydrogenated alkenyl aromatic compound-isoprene block copolymer, and (d) an alkenyl aromatic compound-conjugated diene block copolymer. Use of fillers, such as glass fiber, wollastonite, potassium titanate, whisker, mica, talc, and calcium carbonate, is described.

U.S. Pat. No. 5,206,281 to Furuta et al. generally describes compositions comprising (a) a polyphenylene ether, (b) a propylene polymer modified by grafting with a styrene-based monomer, alone or in combination with a propylene polymer, (c) a rubbery substance, and (d) an inorganic filler having an average particle diameter of 0.05–10 micrometers.

U.S. Pat. No. 5,418,287 to Tanaka et al. generally describes a composition comprising (a) a polyphenylene ether, (b) a crystalline polyolefin resin, and (c) a graft copolymer where the backbone is a copolymer of (i) ethylene or at least one $C_3$–$C_{12}$ alpha-olefin, and (ii) at least one chain nonconjugated diene. Use of reinforcing agents, such as glass fibers, mica, talc, precipitated calcium carbonate, silica, wollastonite, and potassium titanate whisker, is described.

U.S. Pat. No. 6,031,049 to Chino et al. generally describes a composition comprising specific amounts of (a) a component composed of syndiotactic polystyrene and a polyolefin, (b) a block or graft styrene-olefin copolymer having a styrene content of 40 to 85% by weight, and (c) a polyphenylene ether. Use of inorganic fillers is described.

European Patent Application No. 412,787 A2 to Furuta et al. generally describes compositions comprising (a) a polyphenylene ether, (b) a propylene polymer modified by grafting with a styrene-based monomer alone or in combination with another copolymerizable monomer, with or without an unmodified propylene polymer, and (c) a rubbery substance having chain A miscible with all or part of (a) and chain B miscible with all or part of (b). Use of reinforcing agents, including glass fiber filaments, is described.

The commercial value of the above described compositions has been limited by deficiencies in the balance between stiffness and impact strength, as well as the consistency of various properties from batch to batch and from molded sample to molded sample within the same batch. There remains a need for poly(arylene ether)-polyolefin compositions having improved property balances. In particular, there remains a need for poly(arylene ether)-polyolefin compositions exhibiting improved impact strength at very high stiffness. There also remains a need for poly(arylene ether)-polyolefin compositions exhibiting reduced variability in key properties, including stiffness and impact strength.

SUMMARY OF INVENTION

The above-described and other drawbacks and disadvantages of the prior art are alleviated by a composition, comprising: about 10 to about 46 weight percent of a poly(arylene ether); about 2 to about 30 weight percent of a homopolymer of an alkenyl aromatic monomer, wherein the weight ratio of the homopolymer of an alkenyl aromatic monomer to the poly(arylene ether) is at least about 1:10; about 15 to about 50 weight percent of a polyolefin; about 1 to about 15 weight percent of a hydrogenated block copolymer of alkenyl aromatic compound and a conjugated diene having an alkenyl aromatic content of 40 to about 90 weight percent; about 1 to about 15 weight percent of an unhydrogenated block copolymer of alkenyl aromatic compound and a conjugated diene; and about 5 to less than 20 weight percent of glass fibers; wherein all weight percents are based on the total weight of the composition.

Other embodiments, including the reaction product of the above composition and articles derived therefrom, are described below.

DETAILED DESCRIPTION

One embodiment is a thermoplastic composition having very high stiffness while maintaining high impact strength, comprising: about 10 to about 46 weight percent of a poly(arylene ether); about 2 to about 30 weight percent of a homopolymer of an alkenyl aromatic monomer, wherein the weight ratio of the homopolymer of an alkenyl aromatic monomer to the poly(arylene ether) is at least about 1:10; about 15 to about 50 weight percent of a polyolefin; about 1 to about 15 weight percent of a hydrogenated block copolymer of alkenyl aromatic compound and a conjugated diene having an alkenyl aromatic content of 40 to about 90 weight percent; and about 5 to less than 20 weight percent of glass fibers; wherein all weight percents are based on the total weight of the composition.

The composition may comprise any poly(arylene ether). The term poly(arylene ether) includes polyphenylene ether (PPE) and poly(arylene ether) copolymers; graft copolymers; poly(arylene ether) ether ionomers; and block copolymers of alkenyl aromatic compounds, vinyl aromatic compounds, and poly(arylene ether), and the like; and combinations comprising at least one of the foregoing; and the like. Poly(arylene ether)s are known polymers comprising a plurality of structural units of the formula

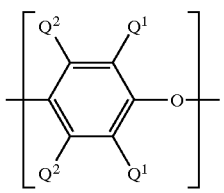

wherein for each structural unit, each $Q^1$ is independently halogen, primary or secondary $C_1$–$C_8$ alkyl, phenyl, $C_1$–$C_8$ haloalkyl, $C_1$–$C_8$ aminoalkyl, $C_1$–$C_8$ hydrocarbonoxy, or $C_2$–$C_8$ halohydrocarbonoxy wherein at least two carbon atoms separate the halogen and oxygen atoms; and each $Q^2$ is independently hydrogen, halogen, primary or secondary $C_1$–$C_8$ alkyl, phenyl, $C_1$–$C_8$ haloalkyl, $C_1$–$C_8$ aminoalkyl, $C_1$–$C_8$ hydrocarbonoxy, or $C_2$–$C_8$ halohydrocarbonoxy wherein at least two carbon atoms separate the halogen and oxygen atoms. Preferably, each $Q^1$ is alkyl or phenyl, especially $C_{1-4}$ alkyl, and each $Q^2$ is independently hydrogen or methyl.

Both homopolymer and copolymer poly(arylene ether)s are included. The preferred homopolymers are those comprising 2,6-dimethylphenylene ether units. Suitable copolymers include random copolymers comprising, for example, such units in combination with 2,3,6-trimethyl-1,4-phenylene ether units or copolymers derived from copolymerization of 2,6-dimethylphenol with 2,3,6-trimethylphenol. Also included are poly (arylene ether)s containing moieties prepared by grafting vinyl monomers or polymers such as polystyrenes, as well as coupled poly (arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether)s of the present invention further include combinations of any of the above.

The poly(arylene ether) generally has a number average molecular weight of about 3,000 to about 40,000 atomic mass units (AMU) and a weight average molecular weight of about 20,000 to about 80,000 AMU, as determined by gel permeation chromatography. The poly (arylene ether) generally may have an intrinsic viscosity of about 0.2 to about 0.6 deciliters per gram (dL/g) as measured in chloroform at 25° C. Within this range, the intrinsic viscosity may preferably be up to about 0.5 dL/g, more preferably up to about 0.47 dL/g. Also within this range, the intrinsic viscosity may preferably be at least about 0.3 dL/g. It is also possible to utilize a high intrinsic viscosity poly(arylene ether) and a low intrinsic viscosity poly(arylene ether) in combination. Determining an exact ratio, when two intrinsic viscosities are used, will depend on the exact intrinsic viscosities of the poly(arylene ether)s used and the ultimate physical properties desired.

The poly(arylene ether)s are typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful poly(arylene ether)s for many purposes include those that comprise molecules having at least one aminoalkyl-containing end group. The aminoalkyl radical is typically located in an ortho position relative to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of the aminoalkyl-containing and 4-hydroxybiphenyl end groups.

The composition may comprise poly(arylene ether) in an amount of about 10 to about 46 weight percent, based on the total weight of the composition. Within this range, it may be preferred to use at least about 15 weight percent of the poly(arylene ether). Also within this range, it may be preferred to use the up to about 30 weight percent of the poly(arylene ether).

The composition further comprises a homopolymer of an alkenyl aromatic monomer, wherein the alkenyl aromatic monomer has the formula

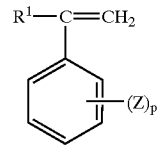

wherein $R^1$ is hydrogen, $C_1$–$C_8$ alkyl, halogen, or the like; Z is vinyl, halogen, $C_1$–$C_8$ alkyl, or the like; and p is 0 to 5. referred alkenyl aromatic monomers include styrene, methylstyrenes including p-methylstyrene, and chlorostyrenes including p-chlorostyrene. A particularly preferred homopolymer of an alkenyl aromatic monomer is the homopolymer derived from styrene (i.e., homopolystyrene). The homopolystyrene preferably comprises at least 99% of its weight, more preferably 100% of its weight, from styrene.

Highly preferred homopolystyrenes include atactic and syndiotactic homopolystyrenes. Suitable atactic homopolystyrenes are commercially available as, for example, EB3300 from Chevron, and P1800 from BASF. Suitable syndiotactic homopolystyrenes are commercially available, for example, under the tradename QUESTRA® (e.g., QUESTRA® WA550) from Dow Chemical Company.

The composition may comprise the homopolymer of an alkenyl aromatic monomer in an amount of about 2 to about 30 weight percent based on the total weight of the composition, with the proviso that the weight ratio of the homopolymer of an alkenyl aromatic monomer to the poly (arylene ether) is at least about 1:10, preferably at least about 2:10. Within this range, it may be preferred to use the alkenyl aromatic monomer in an amount of at least about 3 weight percent. Also within this range, it may be preferred to use the alkenyl aromatic monomer in an amount of up to about 25 weight percent. It may be preferred that the weight ratio of the homopolymer of an alkenyl aromatic monomer to the poly(arylene ether) is up to about 6:10.

The composition further comprises a polyolefin. The polyolefin may be a homopolymer or copolymer having at least about 80 weight percent of units derived from polymerization of ethylene, propylene, butylene, or a mixture thereof. Examples of polyolefin homopolymers include polyethylene, polypropylene, and polybutylene. Examples of polyolefin copolymers include random, graft, and block copolymers of ethylene, propylene, and butylene with each other, and further comprising up to 20 weight percent of units derived from $C_5$–$C_{10}$ alpha olefins (excluding aromatic alpha-olefins). Polyolefins further include blends of the above homopolymers and copolymers. Preferred polyolefins may have a flexural modulus of at least about 100,000 pounds per square inch (psi) at 23° C. as measured according to ASTM D790. Suitable polyolefins may comprise, for example, the linear low density polyethylene available from ExxonMobil as LL-6201, the low density polyethylene available from ExxonMobil as LMA-027, the high density polyethylene available from ExxonMobil as HD-6605, the ultra-high molecular weight polyethylene available as Type 1900 from Montell Polyolefins, and the polybutylene (polybutene-1) available as PBO110 from Montell Polyolefins.

Presently preferred polyolefins include propylene polymers. The propylene polymer may be a homopolymer of polypropylene. Alternatively, the propylene polymer may be a random, graft, or block copolymer of propylene and at least one olefin selected from ethylene and $C_4$–$C_{10}$ alpha-olefins (excluding aromatic alpha-olefins), with the proviso that the copolymer comprises at least about 80 weight percent, preferably at least about 90 weight percent, of repeating units derived from propylene. Blends of such propylene polymers with a minor amount of another polymer such as polyethylene are also included within the scope of propylene polymers. The propylene polymer may have a melt flow index of about 0.1 to about 50 g/10 min, preferably about 1 to about 30 g/10 min when measured according to ASTM D1238 at 2.16 kg and 200° C. The above-described propylene polymers can be produced by various known processes. Commercially available propylene polymers may also be employed.

Preferred propylene polymers include homopolypropylenes. Highly preferred propylene polymers include homopolypropylenes having a crystalline content of at least about 20%, preferably at least about 30%. Suitable isotactic polypropylenes are commercially available as, for example, PD403 pellets from Basell (formerly Montell Polyolefins of North America).

The composition may comprise the polyolefin in an amount of about 15 to about 50 weight percent, preferably about 20 to about 50 weight percent, based on the total weight of the composition.

The composition comprises a hydrogenated block copolymer of an alkenyl aromatic compound and a conjugated diene having an alkenyl aromatic content of 40 to about 90 weight percent (hereinafter referred to as the "hydrogenated block copolymer"). The hydrogenated block copolymer is a copolymer comprising (A) at least one block derived from an alkenyl aromatic compound and (B) at least one block derived from a conjugated diene, in which the aliphatic unsaturated group content in the block (B) is reduced by hydrogenation. The arrangement of blocks (A) and (B) includes a linear structure, a grafted structure, and a radial teleblock structure having a branched chain.

Preferred among these structures are linear structures embracing diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B. More preferred are diblock, triblock, and tetrablock structures, with the A-B-A triblock structure being particularly preferred.

The alkenyl aromatic compound providing the block (A) is represented by formula

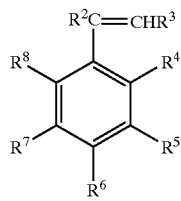

wherein $R^2$ and $R^3$ each independently represent a hydrogen atom, a $C_1$–$C_8$ alkyl group, a $C_2$–$C_8$ alkenyl group, or the like; $R^4$ and $R^8$ each independently represent a hydrogen atom, a $C_1$–$C_8$ alkyl group, a chlorine atom, a bromine atom, or the like; and $R^5$–$R^7$ each independently represent a hydrogen atom, a $C_1$–$C_8$ alkyl group, a $C_2$–$C_8$ alkenyl group, or the like, or $R^4$ and $R^5$ are taken together with the central aromatic ring to form a naphthyl group, or $R^5$ and $R^6$ are taken together with the central aromatic ring to form a naphthyl group.

Specific examples, of the alkenyl aromatic compounds include styrene, p-methylstyrene, alpha-methylstyrene, vinylxylenes, vinyltoluenes, vinylnaphthalenes, divinylbenzenes, bromostyrenes, chlorostyrenes, and the like, and combinations comprising at least one of the foregoing alkenyl aromatic compounds. Of these, styrene, alpha-methylstyrene, p-methylstyrene, vinyltoluenes, and vinylxylenes are preferred, with styrene being more preferred.

Specific examples of the conjugated diene include 1,3-butadiene, 2-methyl-1,3-butadiene, 2,3-dimethyl-1,3-butadiene, 1,3-pentadiene, and the like. Preferred among them are 1,3-butadiene and 2-methyl-1,3-butadiene, with 1,3-butadiene being more preferred.

In addition to the conjugated diene, the hydrogenated block copolymer may contain a small proportion of a lower olefinic hydrocarbon such as, for example, ethylene, propylene, 1-butene, dicyclopentadiene, a non-conjugated diene, or the like.

The content of the repeating unit derived from the alkenyl aromatic compound in the hydrogenated block copolymer may be 40 to about 90 weight percent, based on the total weight of the hydrogenated block copolymer. Within this range, the alkenyl aromatic compound content may preferably be at least about 50 weight percent, more preferably at least about 55 weight percent. Also within this range, the alkenyl aromatic compound content may preferably be up to about 85 weight percent, more preferably up to about 75 weight percent.

There is no particular limitation on the mode of incorporation of the conjugated diene in the hydrogenated block copolymer backbone. For example, when the conjugated diene is 1,3-butadiene, it may be incorporated with about 1% to about 99% 1,2-incorporation, with the remainder being 1,4-incorporation.

The hydrogenated block copolymer is preferably hydrogenated to such a degree that fewer than 50%, more preferably fewer than 20%, yet more preferably fewer than 10%, of the unsaturated bonds in the aliphatic chain moiety derived from the conjugated diene remain unreduced. The aromatic unsaturated bonds derived from the alkenyl aromatic compound may be hydrogenated to a degree of up to about 25%.

The hydrogenated block copolymer preferably has a number average molecular weight of about 5,000 to about 500,000 AMU, as determined by gel permeation chromatography (GPC) using polystyrene standards. Within this range, the number average molecular weight may preferably be at least about 10,000 AMU, more preferably at least about 30,000 AMU, yet more preferably at least about 45,000 AMU. Also within this range, the number average molecular weight may preferably be up to about 300,000 AMU, more preferably up to about 200,000 AMU, yet more preferably up to about 150,000 AMU.

The molecular weight distribution of the hydrogenated block copolymer as measured by GPC is not particularly limited. The copolymer may have any ratio of weight average molecular weight to number average molecular weight.

Some of these hydrogenated block copolymers have a hydrogenated conjugated diene polymer chain to which crystallinity is ascribed. Crystallinity of the hydrogenated block copolymer can be determined by the use of a differential scanning calorimeter (DSC), for example, DSC-II Model manufactured by Perkin-Elmer Co. Heat of fusion can be measured by a heating rate of, for example, 10° C./min in an inert gas atmosphere such as nitrogen. For example, a sample may be heated to a temperature above an estimated melting point, cooled by decreasing the temperature at a rate of 10° C./min, allowed to stand for about 1 minute, and then heated again at a rate of 10° C./min.

The hydrogenated block copolymer may have any degree of crystallinity. In view of a balance of mechanical strength of the resulting resin composition, those hydrogenated block copolymers having a melting point of about −40° C. to about 160° C. or having no definite melting point (i.e., having non-crystallinity), as measured according to the above-described technique, are preferred. Within the melting point range of about −40° C. to about 160° C., it may be preferred to use a hydrogenated block copolymer having a melting point of at least about −20° C., more preferably at least about 0° C., yet more preferably at least about 20° C., still more preferably at least about 40° C. Also within this range, it may be preferred to use a hydrogenated block copolymer having a melting point of up to about 140° C., more preferably up to about 110° C., yet more preferably up to about 100° C.

The hydrogenated block copolymer may have any glass transition temperature ($T_g$) ascribed to the hydrogenated conjugated diene polymer chain. From the standpoint of low-temperature impact strength of the resulting resin composition, it preferably has a $T_g$ of up to about −60° C., more preferably up to about −120° C. The glass transition temperature of the copolymer can be measured by the aforesaid DSC method or from the visco-elastic behavior toward temperature change as observed with a mechanical spectrometer.

Particularly preferred hydrogenated block copolymers are the styrene-(ethylene-butylene) diblock and styrene-(ethylene-butylene)-styrene triblock copolymers obtained by hydrogenation of styrene-butadiene and styrene-butadiene-styrene triblock copolymers, respectively.

The hydrogenated block copolymer may be synthesized by block polymerization followed by hydrogenation as described, for example, in U.S. Pat. No. 4,863,997 to Shibuya et al. Suitable hydrogenated block copolymers include the styrene-(ethylene-butylene) diblock and styrene-(ethylene-butylene)-styrene triblock copolymers commercially available as, for example, TUFTEC® H1043 sold by Asahi Chemical.

The composition may comprise the hydrogenated block copolymer in an amount of about 1 to about 15 weight percent, preferably about 1 to about 10 weight percent, based on the total weight of the composition.

The composition further comprises an unhydrogenated block copolymer of alkenyl aromatic compound and a conjugated diene (referred to hereinafter as an "unhydrogenated block copolymer"). The unhydrogenated block copolymer is a copolymer comprising (A) at least one block derived from an alkenyl aromatic compound and (B) at least one block derived from a conjugated diene, in which the aliphatic unsaturated group content in the block (B) has not been reduced by hydrogenation. The alkenyl aromatic compound (A) and the conjugated diene (B) are defined in detail above in the description of the hydrogenated block copolymer. The arrangement of blocks (A) and (B) includes a linear structure and a so-called radial teleblock structure having a branched chain.

Preferred of these structures are linear structures embracing diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B. More preferred are diblock, triblock, and tetrablock structures, with the A-B-A triblock structure being particularly preferred.

The unhydrogenated block copolymer may comprise about 10 to about 90 weight percent of the (A) blocks. Within this range, it may be preferred to use at least about 20 weight percent (A) blocks. Also within this range, it may be preferred to use up to about 80 weight percent (A) blocks.

Particularly preferred unhydrogenated block copolymers included styrene-butadiene-styrene triblock copolymers.

Suitable unhydrogenated block copolymers may be prepared by known methods or obtained commercially as, for example, KRATON® D series polymers, including KRATON® D1101 and D1102, from Kraton Polymers (formerly a division of Shell Chemical).

The unhydrogenated block copolymers may be used at about 1 to about 15 weight percent, preferably about 1 to about 10 weight percent, based on the total weight of the composition.

The composition further comprises glass fibers. Preferred glass fibers may have diameters of about 2 to about 25 micrometers. Within this range, diameters of at least about 10 micrometers may be preferred, and diameters of at least about 13 micrometers may be more preferred. Also within this range, diameters up to about 20 micrometers may be preferred, and diameters up to about 18 micrometers may be more preferred. The length of the glass fibers may be about 0.1 to about 20 millimeters. Within this range, a length of at least about 1 millimeter may be preferred, and a length of at least about 2 millimeters may be more preferred. Also within this range, a length of up to about 10 millimeters may be preferred, and a length of up to about 8 millimeters may be more preferred. Note that the above lengths refer to the state of the fiber as it is added to the composition; fiber lengths will be smaller after extrusion, molding, etc. Glass fibers comprising a sizing to increase their compatibility with the polyolefin are particularly preferred. Suitable sizings are described, for example, in U.S. Pat. No. 5,998,029 to Adzima et al. Suitable glass fibers are commercially available as, for example, product numbers 147A-14P (14 micrometer diameter) and 147A-17P (17 micrometer diameter) from Owens Corning.

The compatibility of the glass fibers and the polyolefin may be improved not just with sizings on the surface of the fibers, but also by adding to the composition a graft copolymer comprising a polyolefin backbone and polar grafts formed from one or more cyclic anhydrides. Such materials include graft copolymers of polyolefins and $C_4$–$C_{12}$ cyclic anhydrides, such as, for example, those available from ExxonMobil under the tradename EXXELOR® and from DuPont under the tradename FUSABOND®. Examples of suitable polyolefin-graft-cyclic anhydride copolymers are the polypropylene-graft-maleic anhydride materials supplied by ExxonMobil as EXXELOR® PO1020 and by DuPont as FUSABOND® M613-05. Suitable amounts of such materials may be readily determined and are generally about 0.1 to about 10 weight percent, based on the total weight of the composition. Within this range, a polyolefin-graft-cyclic anhydride copolymer amount of at least about 0.5 weight percent may be preferred. Also within this range, a polyolefin-graft-cyclic anhydride copolymer amount of up to about 5 weight percent may be preferred.

The composition comprises glass fibers in an amount of about 5 to less than 20 weight percent, preferably about 5 to about 15 weight percent, based on the total weight of the composition.

The composition may, optionally, further comprise a polypropylene-polystyrene graft copolymer. The polypropylene-polystyrene graft copolymer is herein defined as a graft copolymer having a propylene polymer backbone and one or more styrene polymer grafts.

The propylene polymer material that forms the backbone or substrate of the polypropylene-polystyrene graft copolymer is (a) a homopolymer of propylene; (b) a random copolymer of propylene and an olefin selected from the group consisting of ethylene and $C_4$–$C_{10}$ olefins, provided that, when the olefin is ethylene, the polymerized ethylene content is up to about 10 weight percent, preferably up to about 4 weight percent, and when the olefin is a $C_4$–$C_{10}$ olefin, the polymerized content of the $C_4$–$C_{10}$ olefin is up to about 20 weight percent, preferably up to about 16 weight percent; (c) a random terpolymer of propylene and at least two olefins selected from the group consisting of ethylene and $C_4$–$C_{10}$ alpha-olefins, provided that the polymerized $C_4$–$C_{10}$ alpha-olefin content is up to about 20 weight percent, preferably up to about 16 weight percent, and, when ethylene is one of the olefins, the polymerized ethylene content is up to about 5 weight percent, preferably up to about 4 weight percent; or (d) a homopolymer or random copolymer of propylene which is impact-modified with an ethylene-propylene monomer rubber in the reactor as well as by physical blending, the ethylene-propylene monomer rubber content of the modified polymer being about 5 to about 30 weight percent, and the ethylene content of the rubber being about 7 to about 70 weight percent, and preferably about 10 to about 40 weight percent. The $C_4$–$C_{10}$ olefins include the linear and branched $C_4$–$C_{10}$ alpha-olefins such as, for example, 1-butene, 1-pentene, 3-methyl-1-butene, 4-methyl-1-pentene, 1-hexene, 3,4-dimethyl-1-butene, 1-heptene, 1-octene, 3-methyl-hexene, and the like. Propylene homopolymers and impact-modified propylene homopolymers are preferred propylene polymer materials. Although not preferred, propylene homopolymers and random copolymers impact modified with an ethylene-propylene-diene monomer rubber having a diene content of about 2 to about 8 weight percent also can be used as the propylene polymer material. Suitable dienes include dicyclopentadiene, 1,6-hexadiene, ethylidene norbornene, and the like.

The term "styrene polymer", used in reference to the grafted polymer present on the backbone of propylene polymer material in the polypropylene-polystyrene graft copolymer, denotes (a) homopolymers of styrene or of an alkyl styrene having at least one $C_1$–$C_4$ linear or branched alkyl ring substituent, especially a p-alkyl styrene; (b) copolymers of the (a) monomers with one another in all proportions; and (c) copolymers of at least one (a) monomer with alpha-methyl derivatives thereof, e.g., alpha-methylstyrene, wherein the alpha-methyl derivative constitutes about 1 to about 40% of the weight of the copolymer.

The polypropylene-polystyrene graft copolymer will typically comprise about 10 to about 90 weight percent of the propylene polymer backbone and about 90 to about 10 weight percent of the styrene polymer graft. Within these ranges, the propylene polymer backbone may preferably account for at least about 20 weight percent of the total graft copolymer; and the propylene polymer backbone may preferably account for up to about 40 weight percent of the total graft copolymer. Also within these ranges, the styrene polymer graft may preferably account for at least about 50 weight percent, more preferably at least about 60 weight percent, of the total graft copolymer.

The preparation of polypropylene-polystyrene graft copolymers is described, for example, in U.S. Pat. No. 4,990,558 to DeNicola, Jr. et al. Suitable polypropylene-polystyrene graft copolymers are also commercially available as, for example, P1045H1 and P1085H1 from Basell.

When present, the polypropylene-polystyrene graft copolymer may be used in an amount of about 0.5 to about 10 weight percent, preferably about 4 to about 10 weight percent, based on the total weight of the composition.

The composition may, optionally, further comprise an ethylene/alpha-olefin elastomeric copolymer. The alpha-olefin component of the copolymer may be at least one $C_3$–$C_{10}$ alpha-olefin. Preferred alpha-olefins include propylene, 1-butene, and 1-octene. The elastomeric copolymer may be a random copolymer having about 25 to about 75 weight percent ethylene and about 75 to about 25 weight percent alpha-olefin. Within these ranges, it may be preferred to use at least about 40 weight percent ethylene; and it may be preferred to use up to about 60 weight percent ethylene. Also within these ranges, it may be preferred to use at least about 40 weight percent alpha-olefin; and it may be preferred to use up to about 60 weight percent alpha-olefin. The ethylene/alpha-olefin elastomeric copolymer may typically have a melt flow index of about 0.1 to about 20 g/10 min at 2.16 kg and 200° C., and a density of about 0.8 to about 0.9 g/ml.

Particularly preferred ethylene/alpha-olefin elastomeric copolymer rubbers include ethylene-propylene rubbers, ethylene-butene rubbers, ethylene-octene rubbers, and mixtures thereof.

The ethylene/alpha-olefin elastomeric copolymer may be prepared according to known methods or obtained commercially as, for example, the neat ethylene-propylene rubber sold as VISTALON® 878 by ExxonMobil Chemical and the ethylene-butylene rubber sold as EXACT® 4033 by ExxonMobil Chemical. Ethylene/alpha-olefin elastomeric copolymers may also be obtained commercially as blends in polyolefins such as, for example, the ethylene-propylene rubber pre-dispersed in polypropylene sold as product numbers Profax 7624 and Profax 8623 from Basell, and the ethylene-butene rubber pre-dispersed in polypropylene sold as Catalloy K021P from Basell.

When present, the ethylene/alpha-olefin elastomeric copolymer may be used in an amount of about 1 to about 15 weight percent. Within this range, it may be preferred to use at least about 3 weight percent of the ethylene/alpha-olefin elastomeric copolymer. Also within this range, it may be preferred to use up to about 14 weight percent of the ethylene/alpha-olefin elastomeric copolymer.

In one embodiment, the amount of ethylene/alpha-olefin elastomeric copolymer may be expressed as a fraction of the total of polyolefin and ethylene/alpha-olefin elastomeric copolymer Thus, when the ethylene/alpha-olefin elastomeric copolymer is present, its amount may be expressed as about 1 to about 60 weight percent, based on the combined weight of polyolefin and ethylene/alpha-olefin elastomeric copolymer. Within this range, it may be preferred to use at least about 10 weight percent of the ethylene/alpha-olefin copolymer. Also within this range, it may be preferred to use up to about 40 weight percent of the ethylene/alpha-olefin copolymer.

The composition may, optionally, further comprise a rubber-modified poly(alkenyl aromatic) resin. A rubber-modified poly(alkenyl aromatic) resin comprises a polymer derived from at least one alkenyl aromatic monomer, and further comprises a rubber modifier in the form of a blend and/or a graft.

The alkenyl aromatic monomer may have the formula

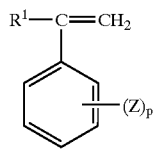

wherein $R^1$ is hydrogen, $C_1$–$C_8$ alkyl, halogen, or the like; Z is vinyl, halogen, $C_1$–$C_8$ alkyl, or the like; and p is 0 to 5. Preferred alkenyl aromatic monomers include styrene, methylstyrenes such as p-methylstyrene, and chlorostyrenes such as p-chlorostyrene.

The rubber modifier may be a polymerization product of at least one $C_4$–$C_{10}$ nonaromatic diene monomer, such as butadiene or isoprene. The rubber-modified poly (alkenyl aromatic) resin comprises about 98 to about 70 weight percent of the poly(alkenyl aromatic) resin and about 2 to about 30 weight percent of the rubber modifier. Within these ranges, polyalkylene resin amounts of at least about 88 weight percent and up to about 94 weight percent may be preferred. Also, within these ranges, rubber modifier amount of at least about 6 weight percent and up to about 12 weight percent may be preferred.

Highly preferred rubber-modified poly(alkenyl aromatic) resins include the styrene-butadiene copolymers containing about 88 to about 94 weight percent styrene and about 6 to about 12 weight percent butadiene. These styrene-butadiene copolymers, also known as high-impact polystyrenes, are commercially available as, for example, GEH 1897 from General Electric Company, and BA 5350 from Chevron Chemical Company.

When present, the rubber-modified poly(alkenyl aromatic) resin may be used in an amount of about 1 to about 40 weight percent, based on the total weight of the composition. In one embodiment, the composition is substantially free of a rubber-modified poly(alkenyl aromatic) resin. The term "substantially free" is herein defined as constituting less than 0.5 weight percent of the total weight of the composition. In this embodiment, it is preferred that the rubber-modified poly(alkenyl aromatic) resin constitute less than 0.1 weight percent of the total weight of the composition.

The composition may, optionally, further comprise a hydrogenated block copolymer of an alkenyl aromatic compound and a conjugated diene, wherein the hydrogenated block copolymer has an alkenyl aromatic content of about 10 to less than 40 weight percent. For this component, the alkenyl aromatic compound and the conjugated diene compound are the same as those defined above for the hydrogenated block copolymer having an alkenyl aromatic content of 40 to about 90 weight percent. Such materials are commercially available as, for example, KRATON® G1650 and G1652 from Kraton Polymers. When present, the hydrogenated block copolymer having an alkenyl aromatic content of about 10 to less than 40 weight percent may be used at about 1 weight percent to about 20 weight percent, based on the total weight of the composition.

In addition to the components described above, the composition may comprise one or more additives known in the art. Such additives may include, for example, stabilizers, mold release agents, processing aids, flame retardants, drip retardants, nucleating agents, UV blockers, dyes, pigments, particulate fillers (i.e., fillers having an aspect ratio less than about 3), additional reinforcing fillers, conductive fillers (e.g., conductive carbon black, and vapor grown carbon fibers having an average diameter of about 3 to about 500 nanometers), antioxidants, anti-static agents, blowing agents, and the like. Such additives are well known in the art and appropriate amounts may be readily determined.

In one embodiment, the composition comprises: about 10 to about 46 weight percent of a poly(arylene ether) that is the polymerization product of 2,6-dimethylphenol, 2,3,6-trimethylphenol, or a combination thereof; about 2 to about 20 weight percent of a homopolymer of an alkenyl aromatic monomer, wherein the weight ratio of the homopolymer of an alkenyl aromatic monomer and the poly(arylene ether) is at least about 1:10; about 15 to about 50 weight percent of a polyolefin; about 0.1 to about 10 weight percent of a polyolefin-graft-cyclic anhydride copolymer; about 1 to about 15 weight percent of a hydrogenated block copolymer of alkenyl aromatic compound and a conjugated diene having an alkenyl aromatic content of 40 to about 90 weight percent; about 1 to about 15 weight percent of an unhydrogenated block copolymer of alkenyl aromatic compound and a conjugated diene; and about 5 to less than 20 weight percent of glass fibers; wherein all weight percents are based on the total weight of the composition.

In a preferred embodiment, the composition comprises: about 10 to about 46 weight percent of a poly(arylene ether) that is the polymerization product of 2,6-dimethylphenol, 2,3,6-trimethylphenol, or a combination thereof; about 2 to about 20 weight percent of a homopolymer of an alkenyl aromatic monomer, wherein the weight ratio of the homopolymer of an alkenyl aromatic monomer and the poly(arylene ether) is at least about 1:10; about 15 to about 50 weight percent of a polyolefin; about 1 to about 15 weight percent of a hydrogenated block copolymer of alkenyl aromatic compound and a conjugated diene having an alkenyl aromatic content of 40 to about 90 weight percent; about 1 to about 15 weight percent of an unhydrogenated block copolymer of alkenyl aromatic compound and a conjugated diene; about 1 to about 15 weight percent of an ethylene/alpha-olefin elastomeric copolymer; and about 5 to less than 20 weight percent of glass fibers; wherein all weight percents are based on the total weight of the composition.

In another preferred embodiment, the composition comprises: about 15 to about 30 weight percent of a poly(arylene ether) that is the polymerization product of 2,6-dimethylphenol, 2,3,6-trimethylphenol, or a combination thereof; about 3 to about 25 weight percent of a homopolymer of a homopolystyrene; about 20 to about 50 weight percent of a homopolypropylene; about 1 to about 10 weight percent of a styrene-(ethylene-butylene)-styrene triblock copolymer having an alkenyl aromatic content of about 55 to about 75 weight percent; about 1 to about 10 weight percent of a styrene-butadiene-styrene triblock copolymer; about 3 to about 14 weight percent of an ethylene-butylene rubber, an ethylene-propylene rubber, or a mixture thereof; and about 5 to less than 20 weight percent of glass fibers having a diameter of about 10 to about 20 micrometers; wherein all weight percents are based on the total weight of the composition.

In another embodiment, the composition comprises the reaction product of: about 10 to about 46 weight percent of a poly(arylene ether); about 2 to about 30 weight percent of a homopolymer of an alkenyl aromatic monomer, wherein the weight ratio of the homopolymer of an alkenyl aromatic monomer to the poly(arylene ether) is at least about 1:10; about 15 to about 50 weight percent of a polyolefin; about 1 to about 15 weight percent of a hydrogenated block copolymer of alkenyl aromatic compound and a conjugated diene having an alkenyl aromatic content of 40 to about 90 weight percent; about 1 to about 15 weight percent of an unhydrogenated block copolymer of alkenyl aromatic compound and a conjugated diene; and about 5 to less than 20 weight percent of glass fibers; wherein all weight percents are based on the total weight of the composition.

The composition after molding may have a flexural modulus at 23° C. measured according to ASTM D790 of at least about 300,000 pounds per square inch (psi), preferably at least about 370,000 psi, more preferably at least about 400,000 psi.

The composition after molding may have an Izod Notched Impact strength measured at 23° C. according to ASTM D256 of at least about 1 foot pound per inch (ft-lb/in), preferably at least about 2 ft-lb/in, more preferably at least about 3 ft-lb/in, yet more preferably at least about 4 ft-lb/in.

The composition after molding may have a heat distortion temperature (HDT) measured at 66 psi according to ASTM D648 at least about 250° F., preferably at least about 290° F., more preferably at least about 300° F. The heat distortion temperature (HDT) measured at 264 psi may be at least about 230° F., preferably at least about 250° F., more preferably at least about 270° F.

The composition after molding may have a tensile elongation measured according to ASTM D638 at least about 2%, preferably at least about 5%, more preferably at least about 8%.

The composition of the invention is useful for use in a variety of articles requiring high stiffness, high tensile strength, and high heat resistance. Such articles include, for example, molded casings for power tools.

As the composition is defined as comprising multiple components, it will be understood that each component is chemically distinct, particularly in the instance that a single chemical compound may satisfy the definition of more than one component.

The preparation of the compositions of the present invention is normally achieved by merely blending the ingredients under conditions for the formation of an intimate blend. Such conditions often include mixing in single- or twin-screw type extruders or similar mixing devices that can apply a shear to the components.

Preferred blending methods are described in detail in the co-filed application U.S. Ser. No. 09/682,929, which is incorporated herein in its entirety. In a preferred embodiment, the components are blended in an extruder having at least two addition ports, with at least about 50%, preferably at least about 75%, more preferably 100% of the poly(arylene ether) added upstream, and at least about 50%, preferably at least about 75%, yet more preferably 100%, of the polyolefin added downstream, and at least 50%, preferably at least 75%, more preferably all, of the glass fibers added downstream. In another preferred embodiment, the components are blended using at least two mixing stages, comprising upstream mixing and downstream mixing, wherein the upstream mixing is high-energy mixing characterized by at least two mixing elements and/or a mixing section not less than about 1 inch in length. Downstream mixing may be either high-energy mixing as described above or low-energy mixing, depending on the composition and desired properties of the composition.

The invention is further illustrated by the following non-limiting examples.

EXAMPLES 1 AND 2

Raw materials used in all example formulations are summarized in Table 1.

Components 1–7 were thoroughly hand mixed in a bag. The contents of this bag were then fed through a feeder and entered the extruder at the throat (extruder initial entry point). Component 8 was then fed into the extruder downstream (entry points were located after the feed throat, approximately barrel 5 of 10).

Specific formulations of examples are given in Table 2. Unless otherwise specified, all component amounts are expressed in parts by weight. Samples were extruded using a 30 mm co-rotating twin screw extruder. Blends were melt extruded at 520° F., 450–500 rpm, and 30–55 pounds per hour. Melt from the extruder was forced through a 3-hole die to produce melt strands. These strands were rapidly cooled by passing them through a cold water bath. The cooled strands were chopped into pellets. Pellets were dried in the oven at 200° F. for 2–4 hours.

ASTM parts were molded on a 120 tonne molding machine (manufacturer: Van Dorn) at 100–120° F. mold temp and a 450–550° F. barrel temperature.

Parts were tested according to ASTM methods. Flexural modulus and flexural strength were measured according to ASTM D790. Heat distortion temperatures (HDT) at 66 and 264 psi were measured according to ASTM D648. Izod notched impact strength was measured according to ASTM D256. Tensile elongation at break and tensile strength at break were measured according to ASTM D638. Energy to maximum load and energy to failure were measured according to ASTM 3763.

Results are presented in Table 2 and show that the composition provides very high flexural modulus and heat distortion temperature with good impact strength.

TABLE 1

| No. | Raw Material | Grade | Description | Form | Source |
|---|---|---|---|---|---|
| 1 | PP pellets | PD403 | isotactic propylene polymer, MFI (200° C./2.16 kg) = 1.5 | Pellets | Montell Polyolefin Inc., North America (now BASELL) |
| 2 | EPR | Vistalon 878 | Ethylene-propylene copolymer, Melt Index (190° C./21.6 kg) = 6.5 g/10 mins, | Pellets | ExxonMobil Chemical |
| 3 | PP-g-PS | Interloy P1045H1 | PP with PS polymer graft which contains about 45 pph of total PP-g-PS | pellets | Montell Polyolefin Inc., North America (now BASELL) |
| 4 | PPE | 0.4 IV | poly(2,6-dimethylphenylene ether) | Powder | General Electric Company |
| 5 | xPS | Chevron EB3300 | homopolystyrene, MFR (200° C., 5 kg) = 10.5 g/10 mins | Pellets | Huntsman Chemical |
| 6 | SBS | Kraton D1101 | contains about 31% PS | Pellets | Shell Chemical company |
| 7 | SEBS H1043 | Tuftec H1043 | Contains about 66% PS | Pellets | Asahi chemical, distributed through Marubeni America Corporation |
| 8 | PP-g-MA | EXXELOR ® PO1020 | polypropylene with about 0.7 wt % poly(maleic anhydride) grafts | Pellets | ExxonMobil |
| 9 | Glass fibers | 147A-14P | Glass fibers, filament diameter = 14 micron, sized for PP matrix, average length = 4 mm | Chopped fibers | Owens Corning |

TABLE 2

|  | Ex. 1 | Ex. 2 |
|---|---|---|
| COMPOSITION | | |
| PP | 20.00 | 20.00 |
| EPR | 8.57 | 0.00 |
| PP-g-PS | 10.00 | 10.00 |
| PPE | 15.00 | 26.40 |
| xPS | 22.50 | 6.60 |
| SBS | 6.93 | 15.00 |
| SEBS H1043 | 5.00 | 10.00 |
| PP-g-MA | 2.00 | 2.00 |
| glass fibers | 10.00 | 10.00 |
| PROPERTIES | | |
| Flex Modulus, 23° C., 1/8" (psi) | 401,800 | 408,700 |
| Flex Strength at Yield (psi) | 12,150 | 12,590 |
| HDT, 66 psi, 1/8" (° F.) | 289.8 | 295.0 |
| HDT, 264 psi, 1/8" (° F.) | 219.8 | 257.8 |
| Notched Izod, 23° C. (ft-lb/in) | 2.4 | 2.5 |
| Notched Izod, −30° C. (ft-lb/in) | 1.6 | 1.9 |
| Unnotched Izod, 23° C. (ft-lb/in) | 10.1 | 9.8 |
| Energy to Max Load, 23° C. (ft-lb) | 2.28 | 2.78 |
| Energy to Failure, 23° C., 7.5 mph (ft-lb) | 7.98 | 9.81 |
| Energy to Max Load, −30° C. (ft-lb) | 6.00 | 3.03 |
| Energy to Failure, −30° C. (ft-lb) | 9.85 | 6.70 |
| Tensile Strength at Break (psi) | 7,588 | 7,642 |
| Tensile Elonation at Break (%) | 8.53 | 7.76 |

EXAMPLES 3–7

These examples demonstrate that the composition may enable excellent property balances even when they do not include a polypropylene-polystyrene graft copolymer. The compositions were prepared and tested according to the procedures described above. The compositions and property values are presented in Table 3. Note that Examples 3 and 4 are replicates, as are Examples 5 and 6. Comparing property values within these replicate pairs illustrates the low sample-to-sample variability enabled by the composition.

TABLE 3

|  | Ex. 3 | Ex. 4 | Ex. 5 | Ex. 6 |
|---|---|---|---|---|
| COMPOSITION | | | | |
| PP | 42.50 | 42.50 | 20.00 | 20.00 |
| EPR | 7.50 | 7.50 | 8.57 | 8.57 |
| PPE | 15.00 | 15.00 | 15.00 | 15.00 |
| xPS | 3.75 | 3.75 | 19.43 | 19.43 |
| SBS | 9.25 | 9.25 | 15.00 | 15.00 |
| SEBS H1043 | 10.00 | 10.00 | 10.00 | 10.00 |
| PP-g-MA | 2.00 | 2.00 | 2.00 | 2.00 |
| glass fibers | 10.00 | 10.00 | 10.00 | 10.00 |
| PROPERTIES | | | | |
| Flexural Modulus, 23° C., 1/8" (psi) | 314,800 | 315,600 | 321,300 | 333,900 |
| Flexural Strength at yield, 23° C., 1/8" (psi) | 10,310 | 10,270 | 10,140 | 10,260 |
| HDT, 66 psi, 1/8" (° F.) | 294.1 | 291.7 | 258.9 | 258.8 |
| HDT, 264 psi, 1/8" (° F.) | 224.4 | 228.1 | 218.1 | 218.1 |
| Notched Izod, 23° C. (ft-lb/in) | 3.7 | 3.8 | 4.1 | 4.5 |
| Notched Izod, −30° C. (ft-lb/in) | 2.2 | 2.3 | 3.1 | 2.9 |
| Unnotched Izod, 23° C., 1/8" (ft-lb/in) | 11.5 | 11.2 | 11.9 | 13.0 |
| Energy to Maximum Load, 23° C., 7.5 mph (ft-lb) | 8.50 | 8.58 | 8.91 | 8.64 |
| Energy to Maximum Load, −30° C., 7.5 mph (ft-lb) | 6.79 | 9.84 | 11.00 | 9.77 |
| Tensile Strength at break, 23° C. (psi) | 6,162 | 6,480 | 6,293 | 6,213 |
| Tensile Elongation at break, 23° C. (%) | 11.47 | 10.53 | 11.40 | 12.42 |

|  | Ex. 7 |
|---|---|
| COMPOSITION | |
| PP | 44.25 |
| EPR | 0.00 |
| PPE | 15.00 |
| xPS | 3.75 |
| SBS | 15.00 |
| SEBS H1043 | 10.00 |
| PP-g-MA | 2.00 |
| glass fibers | 10.00 |
| PROPERTIES | 323,100 |
| Flexural Modulus, 23° C., 1/8" (psi) | 10,510 |
| Flexural Strength at yield, 23° C., 1/8" (psi) | 291.8 |
| HDT, 66 psi, 1/8" (° F.) | 228.6 |
| HDT, 264 psi, 1/8" (° F.) | 3.8 |
| Notched Izod, 23° C. (ft-lb/in) | 2.3 |
| Notched Izod, −30° C. (ft-lb/in) | 11.7 |
| Unnotched Izod, 23° C., 1/8" (ft-lb/in) | 9.05 |
| Energy to Maximum Load, 23° C., 7.5 mph (ft-lb) | 8.44 |
| Energy to Maximum Load, −30° C., 7.5 mph (ft-lb) | 6,431 |
| Tensile Strength at break, 23° C. (psi) | 10.38 |

EXAMPLES 8 AND 9, COMPARATIVE EXAMPLES 1 AND 2

These examples and comparative examples illustrate the advantages associated with the presence of an unhydrogenated block copolymer in the composition. Components are the same as those described in Table 1, except that the poly(arylene ether) (PPE) had an intrinsic viscosity of 0.46 dL/g as measured at 25° C. in chloroform. "Additives" refers to a 1:1:3 weight ratio blend of magnesium oxide, zinc sulfide, and tridodecyl phosphate. Samples were prepared and tested as described for Examples 1–3, above. Compositions and properties are given in Table 4, below. Pair-wise comparisons of samples with and without the unhydrogenated block copolymer SBS show that its presence is associated with higher Notched Izod impact strength at 23° C. and −30° C., higher Energy to Maximum Load at −30° C., and higher Energy to Failure at −30° C.

TABLE 4

|  | C. Ex. 1 | Ex. 8 | C. Ex. 2 | Ex. 9 |
|---|---|---|---|---|
| COMPOSITION |  |  |  |  |
| PP, PD403 | 45.00 | 40.00 | 40.00 | 35.00 |
| EBR | 0.00 | 0.00 | 5.00 | 5.00 |
| SBS | 0.00 | 5.00 | 0.00 | 5.00 |
| SEBS H1043 | 8.00 | 8.00 | 8.00 | 8.00 |
| xPS | 12.00 | 12.00 | 12.00 | 12.00 |
| PP-g-MA | 2.00 | 2.00 | 2.00 | 2.00 |
| glass fibers-14 | 15.00 | 15.00 | 15.00 | 15.00 |
| PPE 0.46 IV | 18.00 | 18.00 | 18.00 | 18.00 |
| Additives | 0.25 | 0.25 | 0.25 | 0.25 |
| PROPERTIES |  |  |  |  |
| Flexural Modulus, 23° C., 1/8" (psi) | 500,900 | 470,000 | 435,600 | 449,700 |
| std. dev. | 41,690 | 7,236 | 6,499 | 6,493 |
| Flexural Strength at Yield, 23° C., 1/8" (psi) | 15,410 | 14,670 | 13,930 | 13,930 |
| std. dev. | 607 | 103 | 141 | 123 |
| HDT, 264 psi, 1/8" (° F.) | 252.2 | 251.1 | 239.3 | 249.9 |
| std. dev. | 4.2 | 2.0 | 3.5 | 0.8 |
| HDT, 66 psi, 1/8" (° F.) | 300.0 | 299.4 | 295.7 | 295.4 |
| std. dev. | 4.2 | 1.2 | 1.0 | 0.4 |
| Notched Izod, 23° C. (ft-lb/in) | 2.1 | 2.3 | 2.7 | 2.9 |
| std. dev. | 0.1 | 0.1 | 0.1 | 0.1 |
| Notched Izod, −30° C. (ft-lb/in) | 1.2 | 1.4 | 1.4 | 1.8 |
| std. dev. | 0.1 | 0.0 | 0.1 | 0.0 |
| Energy to Maximum Load, 23° C., 7.5 mph (ft-lb) | 3.03 | 3.30 | 3.08 | 2.96 |
| std. dev. | 1.03 | 1.66 | 0.91 | 0.27 |
| Energy to Failure, 23° C., 7.5 mph (ft-lb) | 8.77 | 9.66 | 10.29 | 9.96 |
| std. dev. | 2.79 | 0.53 | 0.54 | 0.39 |
| Energy to Maximum Load, −30° C., 7.5 mph (ft-lb) | 4.49 | 4.65 | 5.69 | 5.40 |
| std. dev. | 2.78 | 2.04 | 2.44 | 1.38 |
| Energy to Failure, −30° C., 7.5 mph (ft-lb) | 7.82 | 8.79 | 10.71 | 12.76 |
| std. dev. | 3.94 | 3.45 | 2.09 | 0.68 |
| Energy to Maximum Load, −30° C., 5 mph (ft-lb) | 0.52 | 0.71 | 0.71 | 1.12 |
| std. dev. | 0.08 | 0.41 | 0.27 | 0.43 |
| Energy to Failure, −30° C., 5 mph (ft-lb) | 0.57 | 0.85 | 0.83 | 2.14 |
| std. dev. | 0.08 | 0.50 | 0.30 | 0.57 |
| Tensile Strength at Yield, 23° C. (psi) | 10,051 | 9,959 | 9,564 | 9,482 |
| std. dev. | 42.6 | 51.7 | 40.3 | 49.6 |
| Tensile Strength at Break, 23° C. (psi) | 10,036 | 9,942 | 9,527 | 9,465 |
| std. dev. | 39 | 58 | 48 | 46 |
| Tensile Elongation at Break, 23° C. (%) | 9.35 | 9.08 | 10.36 | 9.57 |
| std. dev. | 0.16 | 0.14 | 0.25 | 0.13 |

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

What is claimed is:

1. A thermoplastic composition, comprising:
   about 10 to about 46 weight percent of a poly(arylene ether);
   about 2 to about 30 weight percent of a homopolymer of an alkenyl aromatic monomer, wherein the weight ratio of the homopolymer of an alkenyl aromatic monomer to the poly(arylene ether) is at least about 1:10;
   about 15 to about 50 weight percent of a polyolefin;
   about 1 to about 15 weight percent of a hydrogenated block copolymer of alkenyl aromatic compound and a conjugated diene having an alkenyl aromatic content of 40 to about 90 weight percent;
   about 1 to about 15 weight percent of an unhydrogenated block copolymer of alkenyl aromatic compound and a conjugated diene; and
   about 5 to less than 20 weight percent of glass fibers;
   wherein all weight percents are based on the total weight of the composition.

2. The thermoplastic composition of claim 1, wherein the poly(arylene ether) comprises a plurality of structural units of the formula

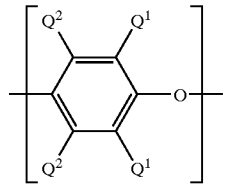

wherein for each structural unit, each $Q^1$ is independently halogen, primary or secondary $C_1$–$C_8$ alkyl, phenyl, $C_1$–$C_8$ haloalkyl, $C_1$–$C_8$ aminoalkyl, $C_1$–$C_8$ hydrocarbonoxy, or $C_2$–$C_8$ halohydrocarbonoxy wherein at least two carbon atoms separate the halogen and oxygen atoms; and each $Q^2$ is independently hydrogen, halogen, primary or secondary $C_1$–$C_8$ alkyl, phenyl, $C_1$–$C_8$ haloalkyl, $C_1$–$C_8$ aminoalkyl, $C_1$–$C_8$ hydrocarbonoxy, or $C_2$–$C_8$ halohydrocarbonoxy wherein at least two carbon atoms separate the halogen and oxygen atoms.

3. The thermoplastic composition of claim 2, wherein each $Q^1$ is independently $C_1$—C alkyl or phenyl, and each $Q^2$ is independently hydrogen or methyl.

4. The thermoplastic composition of claim 1, wherein the poly(arylene ether) comprises a copolymer of 2,6-dimethylphenol and 2,3,6-trimethylphenol.

5. The composition of claim 1, wherein the homopolymer of an alkenyl aromatic monomer is a polymerization product of an alkenyl aromatic monomer of the formula

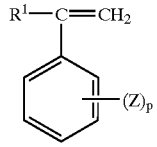

wherein $R^1$ is hydrogen, $C_1$–$C_8$ alkyl, or halogen; Z is vinyl, halogen, or $C_1$–$C_8$ alkyl; and p is 0 to 5.

6. The composition of claim 1, wherein the homopolymer of an alkenyl aromatic monomer comprises homopolystyrene.

7. The composition of claim 1, wherein the homopolymer of an alkenyl aromatic monomer comprises atactic homopolystyrene.

8. The thermoplastic composition of claim 1, wherein the polyolefin comprises a homopolymer or copolymer having at least about 80 weight percent of units derived from polymerization of ethylene, propylene, butylene, or a mixture thereof.

9. The thermoplastic composition of claim 1, wherein the polyolefin is a propylene polymer; and wherein the propylene polymer comprises a homopolymer of polypropylene, or a random, graft, or block copolymer of propylene and at least one olefin selected from ethylene and $C_4$–$C_{10}$ alpha-olefins, with the proviso that the copolymer comprises at least about 80 weight percent of repeating units derived from propylene.

10. The thermoplastic composition of claim 1, wherein the polyolefin comprises a homopolypropylene.

11. The thermoplastic composition of claim 1, wherein the hydrogenated block copolymer comprises:

(A) at least one block derived from an alkenyl aromatic compound having the formula

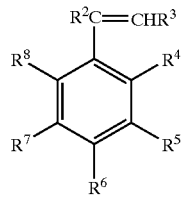

wherein $R^2$ and $R^3$ each represent a hydrogen atom, a $C_1$–$C_8$ alkyl group, or a $C_2$–$C_8$ alkenyl group; $R^4$ and $R^8$ each represent a hydrogen atom, a $C_1$–$C_8$ alkyl group, a chlorine atom, or a bromine atom; and $R^5$–$R^7$ each independently represent a hydrogen atom, a $C_1$–$C_8$ alkyl group, or a $C_2$–$C_8$ alkenyl group, or $R^4$ and $R^5$ are taken together with the central aromatic ring to form a naphthyl group, or $R^5$ and $R^6$ are taken together with the central aromatic ring to form a naphthyl group including; and (B) at least one block derived from a conjugated diene, in which the aliphatic unsaturated group content in the block (B) is reduced by hydrogenation.

12. The thermoplastic composition of claim 1, wherein the hydrogenated block copolymer comprises a styrene-(ethylene-butylene)-styrene triblock copolymer.

13. The thermoplastic composition of claim 1, wherein the hydrogenated block copolymer has a styrene content of about 50 to about 85 weight percent.

14. The thermoplastic composition of claim 1, wherein the hydrogenated block copolymer has a styrene content of about 55 to about 70 weight percent.

15. The thermoplastic composition of claim 1, wherein the unhydrogenated block copolymer comprises a styrene-butadiene diblock copolymer or a styrene-butadiene-styrene triblock copolymer.

16. The thermoplastic composition of claim 1, wherein the glass fibers have a diameter of about 2 to about 25 micrometers.

17. The thermoplastic composition of claim 1, further comprising about 0.5 to about 10 weight percent of a polypropylene-polystyrene graft copolymer having a propylene polymer backbone and one or more styrene polymer grafts.

18. The thermoplastic composition of claim 17, wherein the polypropylene-polystyrene graft copolymer comprises about 10 to about 90 weight percent propylene polymer backbone and about 90 to about 10 weight percent styrene polymer grafts.

19. The composition of claim 1, further comprising about 1 to about 15 weight percent of an ethylene/alpha-olefin elastomeric copolymer.

20. The thermoplastic composition of claim 19, wherein the ethylene/alpha-olefin elastomeric copolymer comprises a copolymer of ethylene and at least one $C_3$–$C_{10}$ alpha-olefin.

21. The thermoplastic composition of claim 19, wherein the ethylene/alpha-olefin elastomeric copolymer comprises an ethylene-butylene rubber, an ethylene-propylene rubber, or a mixture thereof.

22. The composition of claim 1, further comprising about 1 to about 40 weight percent, based on the total weight of the composition, of a rubber-modified poly (alkenyl aromatic) resin comprising a polymer derived from at least one alkenyl aromatic monomer, and further comprising a rubber modifier in the form of a blend and/or a graft.

23. The thermoplastic composition of claim 22, wherein the alkenyl aromatic monomer has the formula

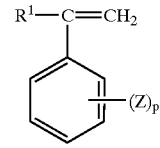

wherein $R^1$ is hydrogen, $C_1$–$C_8$ alkyl, or halogen; Z is vinyl, halogen, or $C_1$–$C_8$ alkyl; and p is 0 to 5.

24. The thermoplastic composition of claim 22, wherein the rubber modifier comprises a polymerization product of at least one $C_4$–$C_{10}$ nonaromatic diene monomer.

25. The composition of claim 1, wherein the composition is substantially free of a rubber-modified poly(alkenyl aromatic) resin.

26. The thermoplastic composition of claim 1, further comprising about 1 to about 20 weight percent of a hydrogenated block copolymer of an alkenyl aromatic compound and a conjugated diene, wherein the hydrogenated block copolymer has an alkenyl aromatic content of about 10 to less than 40 weight percent.

27. The thermoplastic composition of claim 1, further comprising about 0.1 to about 10 weight percent of a polyolefin-graft-cyclic anhydride copolymer.

28. The thermoplastic composition of claim 1, further comprising an additive selected from the group consisting of stabilizers, mold release agents, processing aids, flame retardants, drip retardants, nucleating agents, UV blockers, dyes, pigments, particulate fillers, antioxidants, anti-static agents, blowing agents, and combinations comprising at least one of the foregoing additives.

29. The composition of claim 1, wherein the composition after molding has a flexural modulus measured at 23° C. according to ASTM D790 of at least about 300,000 pounds per square inch.

30. The composition of claim 1, wherein the composition after molding has an Izod Notched Impact strength measured at 23° C. according to ASTM D256 of at least about 1 foot-pound per inch.

31. The composition of claim 1, wherein the composition after molding has an Izod Notched Impact strength measured at 23° C. according to ASTM D256 of at least about 2 foot-pounds per inch.

32. The composition of claim 1, wherein the composition after molding has an Izod Notched Impact strength measured at 23° C. according to ASTM D256 of at least about 3 foot-pound per inch.

33. The composition of claim 1, wherein the composition after molding has a heat distortion temperature measured at 66 psi according to ASTM D648 at least about 290° F.

34. The composition of claim 1, wherein the composition after molding has a flexural modulus measured at 23° C. according to ASTM D790 greater than 300,000 pounds per square inch and an Izod Notched Impact strength measured at 23° C. according to ASTM D256 of at least about 2 foot-pounds per inch.

35. The composition of claim 1, wherein the composition after molding has a flexural modulus measured at 23° C. according to ASTM D790 greater than 400,000 pounds per square inch and an Izod Notched Impact strength measured at 23° C. according to ASTM D256 of at least about 2 foot-pounds per inch.

36. A thermoplastic composition, comprising:
   about 10 to about 46 weight percent of a poly(arylene ether) that is the polymerization product of 2,6-dimethylphenol, 2,3,6-trimethylphenol, or a combination thereof;
   about 2 to about 20 weight percent of a homopolymer of an alkenyl aromatic monomer, wherein the weight ratio of the homopolymer of an alkenyl aromatic monomer to the poly(arylene ether) is at least about 1:10;
   about 15 to about 50 weight percent of a polyolefin;
   about 0.1 to about 10 weight percent of a polyolefin-graft-cyclic anhydride copolymer;
   about 1 to about 15 weight percent of a hydrogenated block copolymer of alkenyl aromatic compound and a conjugated diene having an alkenyl aromatic content of 40 to about 90 weight percent;
   about 1 to about 15 weight percent of an unhydrogenated block copolymer of alkenyl aromatic compound and a conjugated diene; and
   about 5 to less than 20 weight percent of glass fibers;
   wherein all weight percents are based on the total weight of the composition.

37. A thermoplastic composition, comprising:
   about 10 to about 46 weight percent of a poly(arylene ether) that is the polymerization product of 2,6-dimethylphenol, 2,3,6-trimethylphenol, or a combination thereof;
   about 2 to about 20 weight percent of a homopolymer of an alkenyl aromatic monomer, wherein the weight ratio of the homopolymer of an alkenyl aromatic monomer to the poly(arylene ether) is at least about 1:10;
   about 15 to about 50 weight percent of a polyolefin;
   about 1 to about 15 weight percent of a hydrogenated block copolymer of alkenyl aromatic compound and a conjugated diene having an alkenyl aromatic content of 40 to about 90 weight percent;
   about 1 to about 15 weight percent of an unhydrogenated block copolymer of alkenyl aromatic compound and a conjugated diene;
   about 1 to about 15 weight percent of an ethylene/alpha-olefin elastomeric copolymer; and
   about 5 to less than 20 weight percent of glass fibers;
   wherein all weight percents are based on the total weight of the composition.

38. A thermoplastic composition, comprising:
   about 15 to about 30 weight percent of a poly(arylene ether) that is the polymerization product of 2,6-dimethylphenol, 2,3,6-trimethylphenol, or a combination thereof;
   about 3 to about 25 weight percent of a homopolymer of a homopolystyrene;
   about 20 to about 50 weight percent of a homopolypropylene;
   about 1 to about 10 weight percent of a styrene-(ethylene-butylene)-styrene triblock copolymer having an alkenyl aromatic content of about 55 to about 75 weight percent;
   about 1 to about 10 weight percent of a styrene-butadiene-styrene triblock copolymer;
   about 3 to about 14 weight percent of an ethylene-butylene rubber, an ethylene-propylene rubber, or a mixture thereof; and
   about 5 to less than 20 weight percent of glass fibers having a diameter of about 10 to about 20 micrometers;
   wherein all weight percents are based on the total weight of the composition.

39. A thermoplastic composition, comprising the reaction product of:
   about 10 to about 46 weight percent of a poly(arylene ether);
   about 2 to about 30 weight percent of a homopolymer of an alkenyl aromatic monomer, wherein the weight ratio of the homopolymer of an alkenyl aromatic monomer to the poly(arylene ether) is at least about 1:10;
   about 15 to about 50 weight percent of a polyolefin;
   about 1 to about 15 weight percent of a hydrogenated block copolymer of alkenyl aromatic compound and a conjugated diene having an alkenyl aromatic content of 40 to about 90 weight percent;
   about 1 to about 15 weight percent of an unhydrogenated block copolymer of alkenyl aromatic compound and a conjugated diene; and
   about 5 to less than 20 weight percent of glass fibers;
   wherein all weight percents are based on the total weight of the composition.

* * * * *